(12) United States Patent
Zeichner

(10) Patent No.: US 8,459,174 B2
(45) Date of Patent: Jun. 11, 2013

(54) ROD-LESS CYLINDER DEVICE AND SYSTEM AND METHOD FOR OPERATING THEREOF

(76) Inventor: Eliezer Zeichner, Ramat Gan (IL)

( * ) Notice: Subject to any disclaimer, the term of this patent is extended or adjusted under 35 U.S.C. 154(b) by 967 days.

(21) Appl. No.: 12/527,570

(22) PCT Filed: Oct. 16, 2007

(86) PCT No.: PCT/IL2007/001243
§ 371 (c)(1),
(2), (4) Date: Aug. 18, 2009

(87) PCT Pub. No.: WO2008/102335
PCT Pub. Date: Aug. 28, 2008

(65) Prior Publication Data
US 2010/0083823 A1    Apr. 8, 2010

Related U.S. Application Data

(60) Provisional application No. 60/902,511, filed on Feb. 22, 2007.

(51) Int. Cl.
*F01B 9/04* (2006.01)
*F01B 31/12* (2006.01)

(52) U.S. Cl.
USPC ............................... 92/136; 92/5 R; 74/89.32

(58) Field of Classification Search
USPC .................. 74/27, 89.32, 89.33, 89.37; 91/1, 91/361, 363 R; 92/5 R, 88, 136; 356/399, 356/400, 614–622
See application file for complete search history.

(56) References Cited

U.S. PATENT DOCUMENTS

| | | | |
|---|---|---|---|
| 4,669,359 A * | 6/1987 | Shiba | 91/361 |
| 5,370,011 A | 12/1994 | Gilges et al. | |
| 5,454,238 A | 10/1995 | Ross et al. | |
| 5,590,580 A * | 1/1997 | Nagai | 92/136 |
| 5,613,421 A | 3/1997 | Abe | |
| 6,789,458 B2 * | 9/2004 | Schumacher et al. | 91/363 R |

OTHER PUBLICATIONS

International Search Report mailed Aug. 5, 2008 for PCT/IL2007/001243.
Written Opinion of the International Searching Authority mailed Aug. 5, 2008 for PCT/IL2007/001243.

* cited by examiner

*Primary Examiner* — Michael Leslie
(74) *Attorney, Agent, or Firm* — The Law Office of Michael E. Kondoudis

(57) ABSTRACT

The disclosure provides a rod-less cylinder, device adapted to longitudinally displace loads, said device comprising a shaft, a nut confined to move longitudinally within the shaft, a slider circumscribing said shaft and coupled to said nut, a drive adapted to displace said nut within said shaft, and a sensing means adapted to affect a signal sent via wireless means towards said drive.

25 Claims, 19 Drawing Sheets

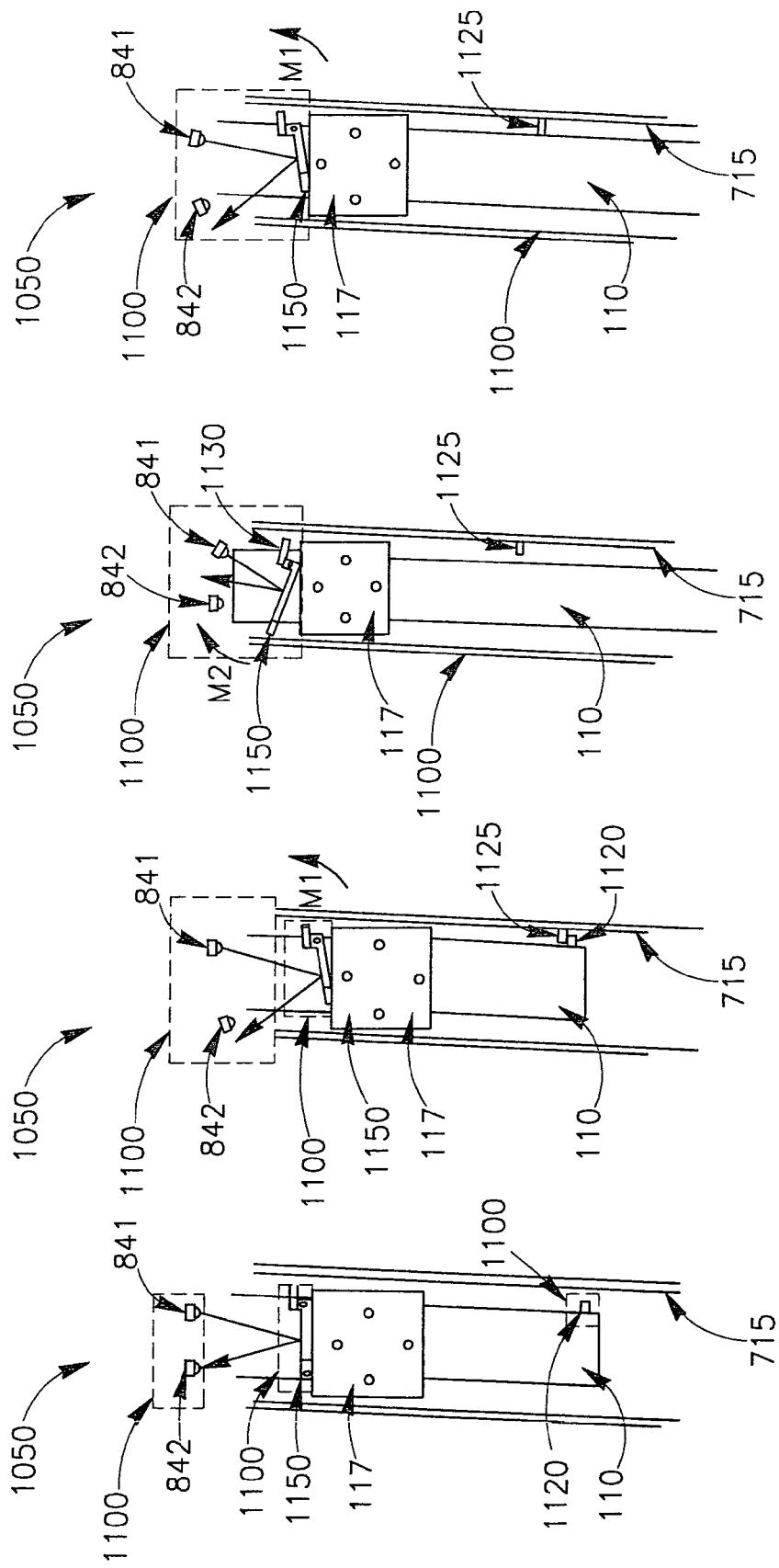

ROD-LESS CYLINDER DEVICE AND SYSTEM AND METHOD FOR OPERATING THEREOF

CROSS REFERENCE TO RELATED APPLICATIONS

This application is a national phase of international application No. PCT/IL2007/001243, filed Oct. 16, 2007, which in turn claimed the benefit of U.S. Provisional Patent Application 60/902,511, filed Feb. 22, 2007, all of which are incorporated herein by reference in their entirety.

FIELD OF THE INVENTION

The present invention relates to the field of linear actuators. More specifically, the present invention relates to field of linear actuators of the type of rod-less cylinders.

BACKGROUND OF THE INVENTION

U.S. Pat. No. 5,613,421, the disclosure of which is incorporated herein by reference, describers a rod-less cylinder in the form of a tube with a piston slidably received therein. The piston is adapted to move a carriage member of a rectangular shape that is located on the outer periphery of the tube. Movement of the piston within the cylinder is controlled by air pressure and a detecting sensor detects movement of the piston.

SUMMARY

The following embodiment and aspects thereof are described and illustrated in conjunction with systems, tools and methods which are meant to be exemplary and illustrative, not limiting in scope.

In an embodiment a rod-less cylinder device that is adapted to longitudinally displace loads comprises a shaft, a nut confined to move longitudinally within the shaft, a slider circumscribing said shaft and coupled to said nut, a drive adapted to displace said nut within said shaft, and a sensing means, wherein said sensing means is adapted to affect a signal sent via wireless means towards said drive. In some aspects of the disclosure the signal may be sent directly to the drive to thereby affect operation of the drive. In other aspects of the disclosure, the signal may reach the drive via various intermediate means. Optionally such an intermediate means is a controller that controls the operation of the drive.

In some embodiments said device is adapted to selectably lower from and lift appliances into storage compartments thereby enabling to implement an overhead kitchen system.

In some embodiments said wireless means is optic means.

In some embodiments said optic means comprises a light source and a light detector wherein said sensing means determines whether light emitted by said source is detected by said detector.

In some embodiments said optic means comprises a reflector adapted to reflect light received from said source along a path towards said detector, and wherein said sensing means is adapted to bias said reflector and thereby deflect the light away from said detector. In some aspects of the disclosure the path along which the light travels is a non direct path that may pass through various stations. Optionally such a station is a reflector or the like.

In some embodiments said sensing means is associated with an object being biased by said nut, said object being adapted to slightly move in relation to said nut when abutting an obstacle, wherein said slight movement urges said sensing means to bias the reflector. Said object being biased by the nut may be directly or non directly coupled to the nut. In a non-limiting example, said object may be the formwork, the slider or the item support.

In some embodiments said optic means comprises a reflector mounted to said sensing means, and wherein at least at one position of said sensing means said light from said source is reflected along a path towards said detector.

In some embodiments said optic means comprises a reflector adapted to reflect light received from said source along a path towards said detector, and wherein at least at one position of said device said sensing means blocks light being emitted from said source or being reflected towards said detector.

In some embodiments said sensing means is associated with an object being biased by said nut, said object being adapted to slightly move in relation to said nut when abutting an obstacle, wherein said slight movement urges the sensing means to block said light being emitted from said source or being reflected towards said detector. In some aspects of the disclosure, said sensing means is a lever adapted to rotate about an axis to thereby block the light.

In some embodiments, said sensing means is a plate or any object that may be placed to block or divert the light.

In some embodiments, said plate is coupled to said nut.

In some embodiments, said reflector is a retro reflector that sends light or other radiation back where it came from regardless of the angle of incidence.

In some embodiments, said device comprises a lead screw adapted to move said nut along said shaft.

In some embodiments, said sensing means is adapted to sense the movement of said nut according to the rate of rotation of said lead screw.

In some embodiments, said sensing means comprises a magnet.

In some embodiments, each time said magnet rotates a predefined angle a signal is sent to said sensing means.

In some embodiments at given time intervals said sensing means determines movement rate of said nut according to the rate of signals received.

In some embodiments, a deviation in movement rate between subsequent time intervals being above a predetermined threshold stops said drive.

In some embodiments said sensing means stops the movement of said nut.

In some embodiments, the movement is stopped if an object being biased by said nut reaches an end of the shaft or abuts an obstacle.

In an embodiment is provided a system comprising at least two cylinders being configured to displace a same load, wherein said system controls the movement provided by each cylinder to be similar.

In addition to the exemplary aspects and embodiment described above, further aspects and embodiments will become apparent by reference to the figures and by study of the following detailed descriptions.

BRIEF DESCRIPTION OF THE DRAWINGS

The subject matter regarded as the invention will become more clearly understood in light of the ensuing description of embodiments thereof, given by way of example only, with reference to the accompanying drawings, wherein

FIG. 2 is an exploded view of the rod-less cylinder device, according to the embodiment of FIG. 1a;

FIG. 3 is another isometric view of the rod-less cylinder device according to the embodiment of FIG. 1a;

FIG. 4a is a schematic cross-sectional front view of the rod-less cylinder device, according to the embodiment of FIG. 1a;

FIG. 4b is a schematic sectional side view of the rod-less cylinder device, according to the embodiment of FIG. 1a;

FIG. 5a is an isometric view of a sliding-type bearing element, according to the embodiment of FIG. 1a;

FIG. 7b is an isometric view of the rod-less cylinder lifting system, wherein an item support of the holder mechanism supports an item, according to the embodiment of FIG. 7a;

FIG. 12a is a schematic side view of the rod-less cylinder lifting system, wherein the system is equipped with an alternative system safety mechanism, according to an embodiment of the invention;

FIG. 12b is a schematic side view of the rod-less cylinder lifting system, which includes the safety mechanism according to the embodiment of FIG. 12a, wherein the sleeve is in its lowest position;

FIG. 12c is a schematic side view of the rod-less cylinder lifting system, which includes the safety mechanism according to the embodiment of FIG. 12a, wherein the sleeve is in its highest position;

FIG. 12d is a schematic side view of the rod-less cylinder lifting system, which includes the safety mechanism according to the embodiment of FIG. 12a, wherein the formwork collides with an obstacle;

FIG. 13b is a schematic illustration of a length-sectional view of device 100 showing the optical setup, according to the embodiment of FIG. 13a;

Figure 1A:
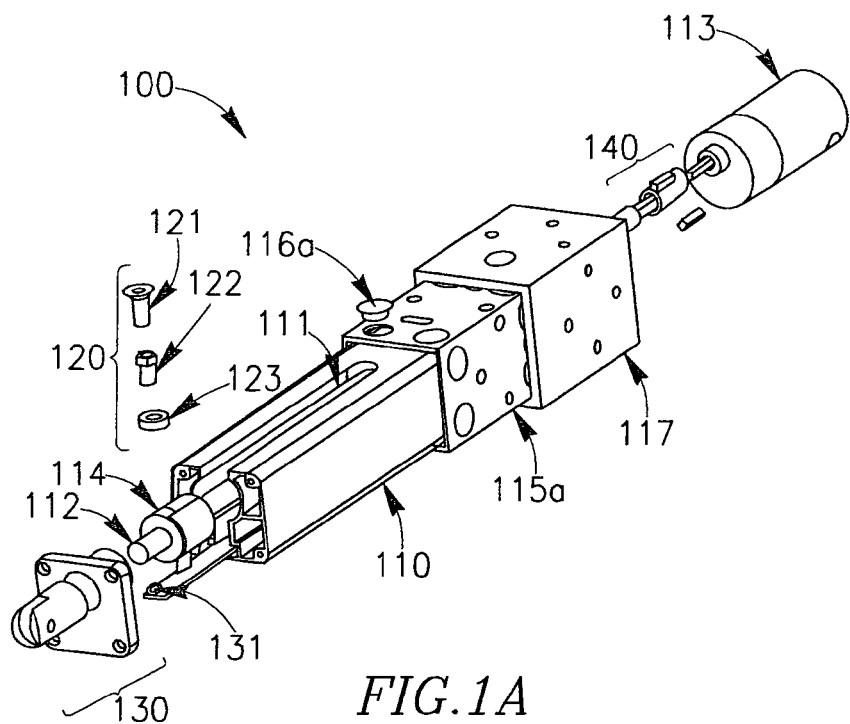
FIG. 1a is a schematic isometric view of a rod-less cylinder device equipped with a bearing cage adapted to accommodate sliding-type bearing elements, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

The present invention provides a rod-less cylinder system, device and method for operating thereof that enable lifting and lowering of various items such as, for example, kitchen items, aircrafts, vehicles, furniture and the like. Accordingly, the rod-less cylinder device and system as well as the method for operating thereof presented hereinafter can be utilized for implementing an overhead kitchen system. In such an overhead kitchen system, the kitchen appliances can be selectably lifted into and lowered from respective storage compartments. Thus configured, an overhead kitchen system provides a space-saving alternative.

It is to be understood that an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It is understood that the phraseology and terminology employed herein is not to be construed as limiting and is for descriptive purpose only.

The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, integers or groups thereof and that the terms are not to be construed as specifying components, features, steps or integers.

The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not to be construed as there being only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "right", "left", "bottom", "below", "low", "top", "above", "elevated" and "high" as well as grammatical variations thereof as used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

The present invention relates to a novel rod-less cylinder device enabling longitudinal displacement of loads adjusted thereto.

Reference is now made to FIG. 1a, FIG. 1b, FIG. 2, FIG. 3, FIG. 4a, FIG. 4b, FIG. 5a and FIG. 5b.

A rod-less shaft device (hereinafter referred to as "device") 100 includes according to an embodiment of the invention, a shaft 110 having a slot 111 that extends towards one edge of the shaft 110. Device 100 further includes a lead-screw 112, which extends along and within shaft 110 and which is operatively associated to a drive 113 by a coupler 140. In addition, device 100 includes a nut 114 that has an opening for receiving lead-screw 112. Nut 114 is slidably adjusted within device 100 and is substantially confined to move longitudinally within the shaft 110, i.e., nut 114, fastener 120 and shaft 110 are configured such that nut 114 cannot rotate. In addition, device 100 includes a bearing cage, such as bearing cage 115a or 115b, and a slider 117 adjusted to bearing cage 115a or 115b. For exemplary purposes only, a bearing cage is hereinafter referred to as bearing cage 115a though it is to be understood that a bearing cage may also refer to bearing cage 115b.

According to an embodiment of the invention, bearing cage 115a circumscribes the perimeter of shaft 110. Accordingly, shaft 110 provides bearing cage 115a with a supporting structure, which is operative in all directions, thereby substantially increasing robustness of device 100. Correspondingly, bearing cage 115a and/or shaft 110 are adapted to bear large moments as well as bending and shear forces.

Figure 1B:
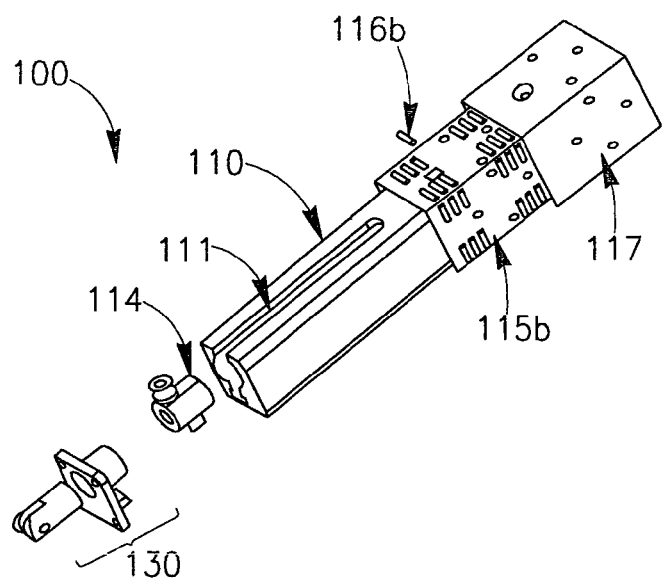
FIG. 1b is a schematic isometric view of the rod-less cylinder device equipped with a bearing cage adapted to rotatably accommodate rotatable-type bearing elements, according to another embodiment of the invention.
Figure 2:
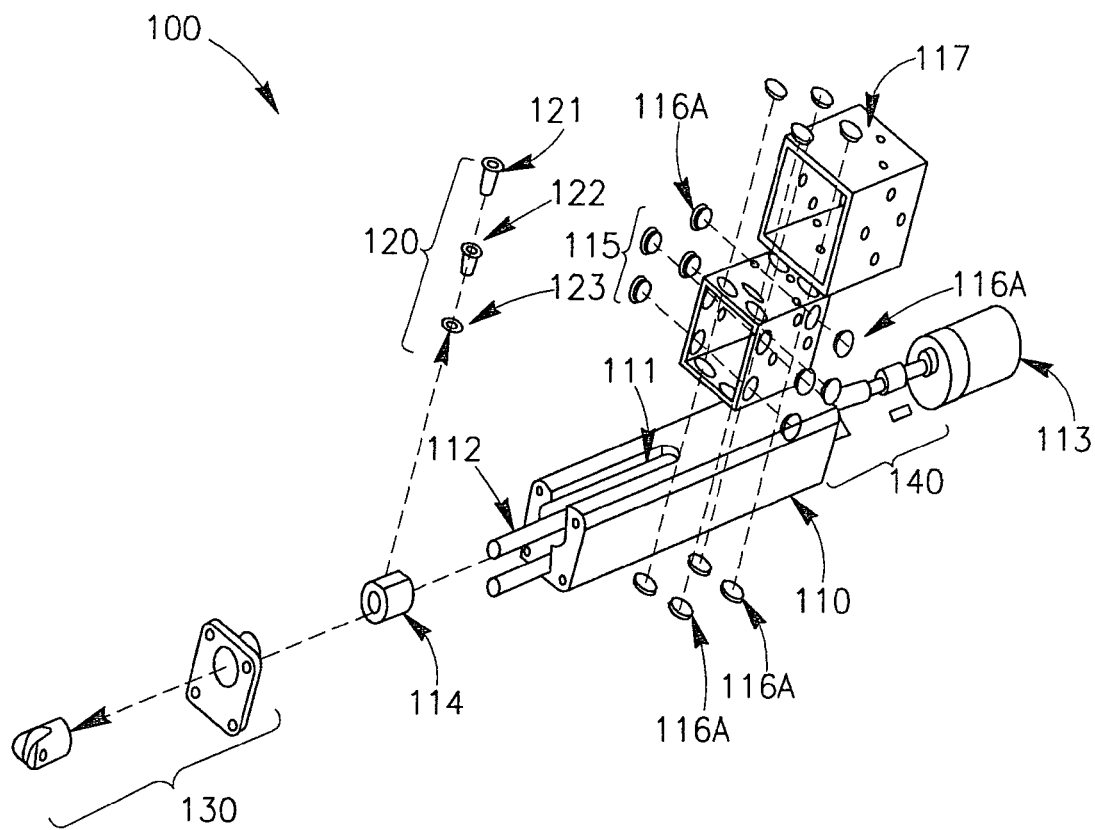
Figure 5A:
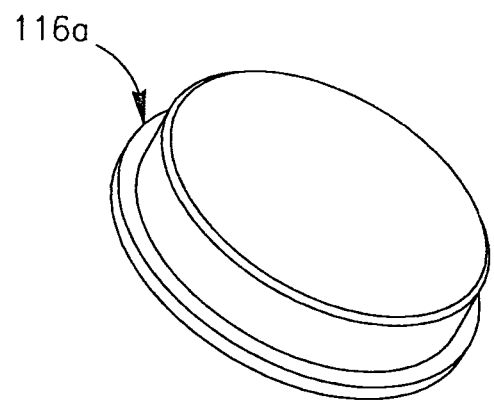
Figure 5B:
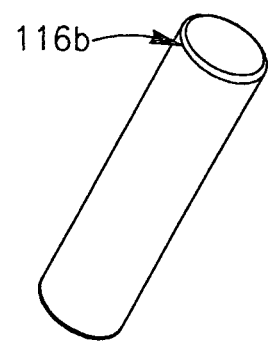
FIG. 5b is an isometric view of the rotatable-type bearing element, according to the embodiment of FIG. 1b.

According to some embodiments of the invention, a bearing cage accommodates a plurality of bearing elements that enable slider 117 to slide along shaft 110 substantially frictionless. In one embodiment of the invention, as illustrated in FIG. 1a, the bearing cage implemented by the cage 115a is adapted to fixedly accommodate sliding-type bearing elements 116a, which may be of the form of a cushion. Sliding-type bearing elements 116a are schematically illustrated in FIG. 5a. In another embodiment of the invention, as illustrated in FIG. 1b, the bearing cage as implemented by cage 115b is adapted to rotatably accommodate rotatable-type bearing elements 116b which may be of the form of a cylinder. Rotatable-type bearing elements 116b are schematically illustrated in FIG. 5b.

Figure 3:
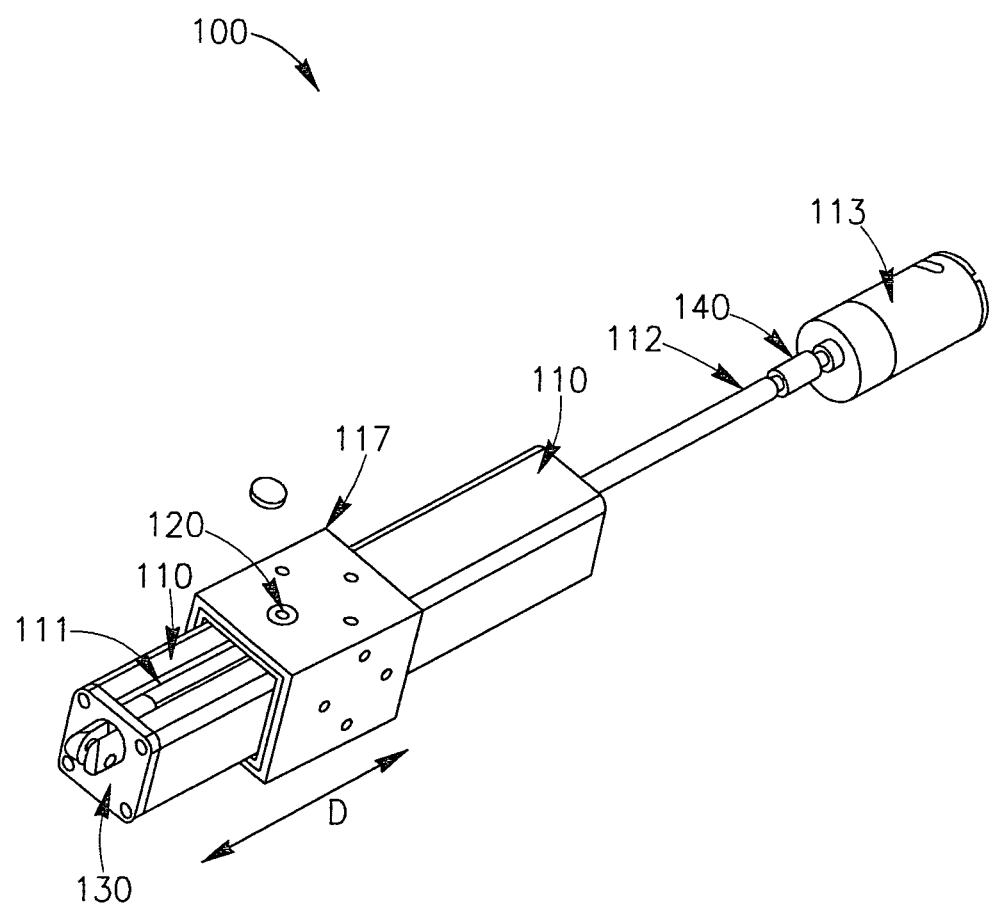
Figure 4A:
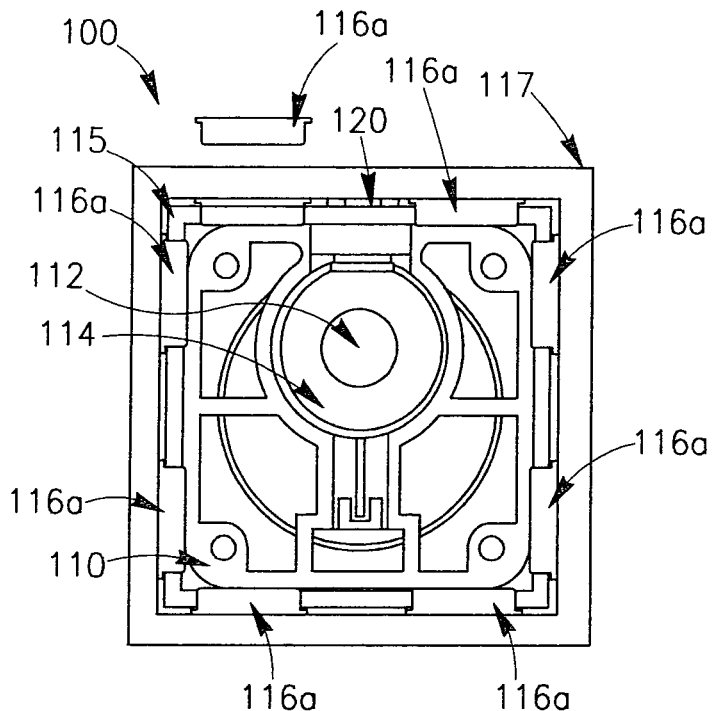
Figure 4B:
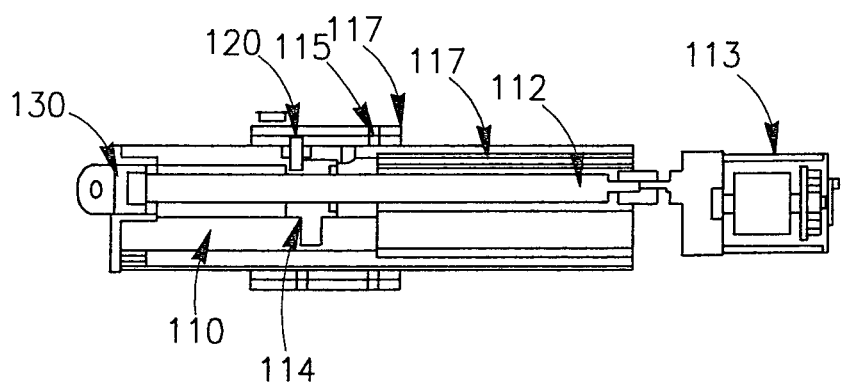
Figure 6:
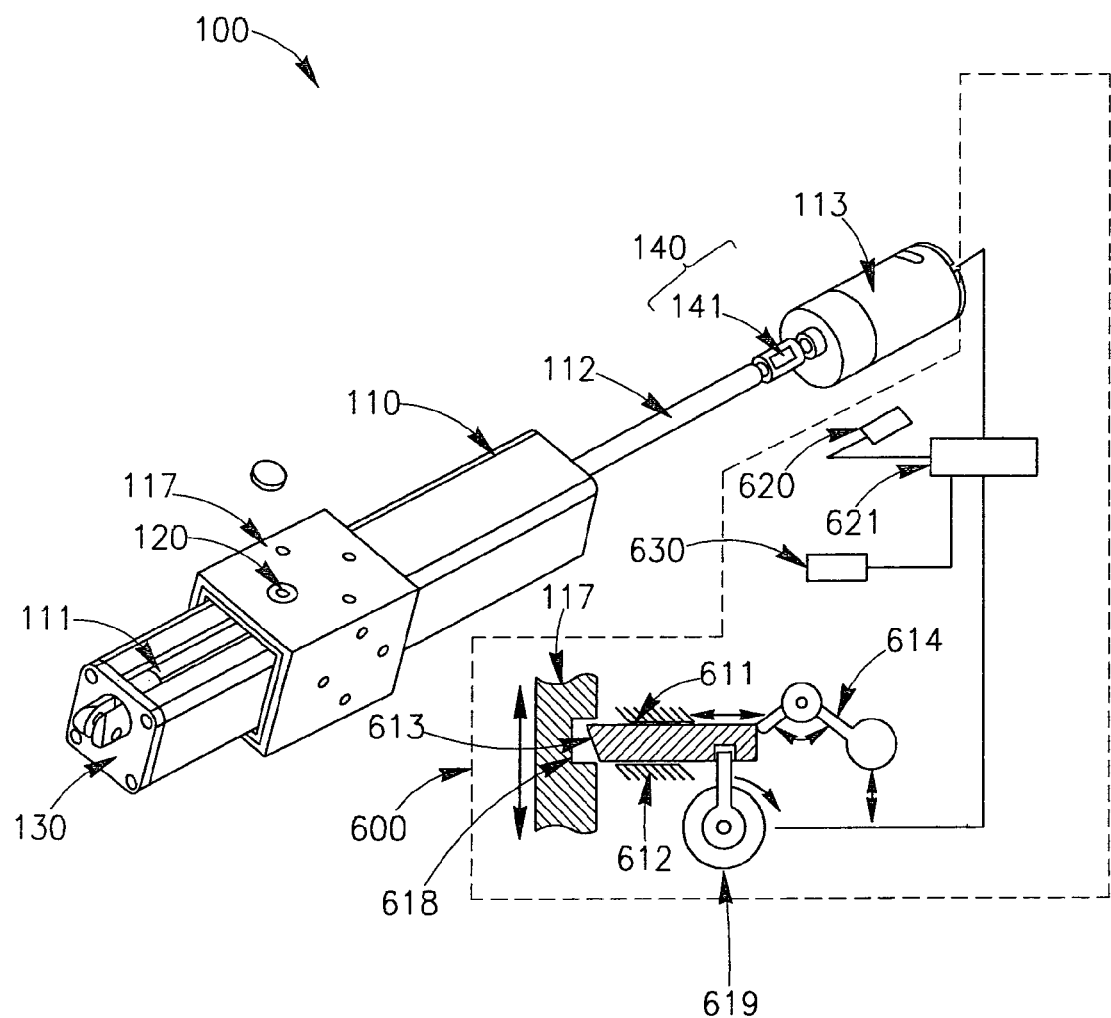
FIG. 6 is an isometric view of the rod-less cylinder device operatively associated with a sleeve safety mechanism, according to an embodiment of the invention.

Bearing cage 115a and slider 117 are mechanically coupled, via slot 111, to nut 114 by a fastener 120. According to an embodiment of the invention, fastener 120 includes a screw 121, a spacer nut 122 and a radial bearing 123. Operating the drive 113 causes rotation of the lead-screw 112. In turn, nut 114 moves longitudinally along shaft 110, whereby the direction of the longitudinal displacement depends on the rotational direction of drive 113. A user of device 100 may set the rotational direction by providing a suitable input to, e.g., sensor 630 (FIG. 6). Longitudinal displacement of nut 112 is schematically indicated in FIG. 3 with arrow D.

According to some embodiments of the invention, shaft 110 has a covering 130 and is equipped with a sensor 131 (FIG. 1a) that is operatively associated with a controller (not shown) of drive 113. In the event sensor 131 senses that nut 114 reached the edge of shaft 110, sensor 131 provides the controller with an input that causes operation of drive 113 to stop. Non-limiting examples of sensor 131 are microswitches, magnetic reed switches, photoelectric interrupter, reflective switches, Hall Effect sensors, or other suitable proximity sensors or switches. Sending the input from sensor 131 to the controller for stopping the operation of drive 113 can be accomplished, for example, with wire or wireless communication means or with mechanical transmission means.

Figure 18:
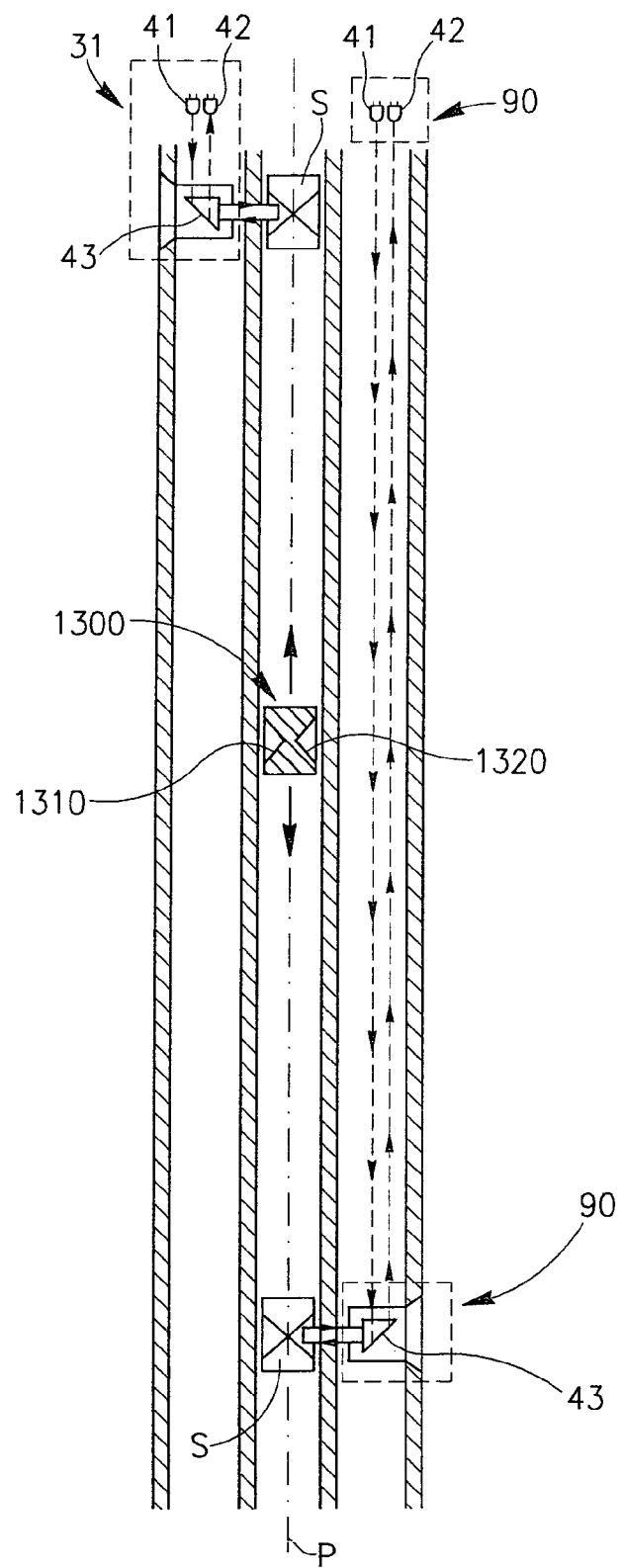
FIG. 18 is schematic view of a wireless limit sensor according to an embodiment of the invention.

Reference is made to FIG. 18. According to some embodiments of the invention, a sensor 1300 in the form of a moving nut extension may be operatively associated with a controller (not shown) or drive 113 in a wireless manner. Optionally, the wireless manner is accomplished by optical setups 90, 91 whose elements are schematically encircled by dashed boxes. The sensor 1300 may be mounted to any moving object to sense a location of the object. Optionally, the object is the nut 114 (not seen in FIG. 18) and the sensor provides the controller with an input that causes operation of drive 113 to stop.

According to an embodiment of the invention, each optical setup 90, 91 includes a light source 41, a light detector 42 and a stationary right angle prism 43. The a moving nut extension 1300 is adapted to move along a path P and includes two retro reflectors 1310, 1320 on opposing sides thereof. Light emitted from a light source 41 is substantially reflected by stationary right angle prism 43 to intersect the path P at a sensing location S. When the moving nut extension 1300 reaches a sensing location S along the path P, the light is substantially reflected by one of its retro reflector 1310, 1320 back to the stationary right angle prism 43, which in turn substantially reflects the light to the light detector 42. It is noted that retro reflectors are adapted to send light or other radiation back to where it came from, regardless of the angle of incidence and therefore less accuracy is required when placing them in a device in accordance with the present invention. In addition it is noted that any other reflector may be used instead of right angle prism 43.

Further reference is now made to FIG. 6. According to some embodiments of the invention, device 100 is operatively associated with a sleeve safety mechanism 600 that is adapted to prevent uncontrolled sliding of slider 117.

Sleeve safety mechanism 600 includes a latch 611 that has an inclined surface 613 facing slider 117. Latch 611 is confined to move longitudinally within a track 612. Sleeve safety mechanism 600 further includes a lever 614 that is rotatably coupled to a fixed support (not shown) and that pushes latch 611 towards slider 117.

When slider 117 is propelled by drive 113 towards an elevated position, which is a position wherein groove 618 is above latch 611, the upper edge of slider 117 interacts with the inclined surface 613 such that latch 611 is pushed back into track 612. Additional propulsion of slider 117 into the elevated position causes latch 611 to snap into groove 618 of slider 117. If the slider is further propelled to the elevated position, inclined surface 613 slides on the lower edge of groove 618, thereby pushing latch 611 out of groove 618.

In the event of uncontrolled downward movement of slider 117 from the elevated position, latch 611 click shuts into groove 618 due to the force W applied on the latch 611 by lever 614, thus preventing further uncontrolled downward movement of slider 117.

In order to enable controlled downward movement of slider 117, a drive 619 retracts latch 611 into track 612, thus preventing latch 611 from snapping into groove 618.

According to some embodiments of the invention, drive 619 is actuated by a fluid pressure mechanism, gas pressure mechanism, rack-and-pinion mechanism, or by any other suitable mechanism, e.g. electric motor, known in the art, and may be controlled by a controller 621.

The information whether downward movement of slider 117 is uncontrolled or not, may be provided to controller 621 by a sensor 620, which is operatively associated with drive 113 and/or slider 117.

According to some embodiments of the invention, device 100 is equipped with a magnet 141, which is operatively associated with lead-screw 112 such that rotation of lead-screw 112 causes magnet 141 to rotate as well. Furthermore, magnet 141 is operatively associated with sensor 620 such that each time when magnet 141 rotates for a predefined angle, sensor 620 generates a corresponding signal (hereinafter referred to as "rotation-indicating-signal") that is sent to controller 621. The rotation-indicating-signal may be sent, for example, each time when sensor 620 senses that magnet 141 substantially passes the predetermined angle, which may correspond to, e.g., ½π, π, 2π, 4π radians, and the like. In some embodiments of the invention, sensor 620 starts determining the angle traversed by rotating magnet 141 upon initiation of drive 113, whereby subsequent determination of the angle traversed by rotating magnet 141 is measured relative to the previous occurrence at which sensor 620 sensed that magnet 141 rotationally traversed said predetermined angle.

According to some embodiments of the invention, controller 621 stops drive 113 in the event that the rate at which rotation-indicating-signal is sent to controller 621 deviates from a predetermined threshold value or from an upper or lower threshold limit. For example, controller 621 stops the operation of drive 113 in the event that the ratio between the rotating frequency of drive 113 and the rate at which rotation-indicating-signal is sent to controller 621 exceeds the upper threshold limit. Such an event may occur, for example, when gear teeth of drive 113 are stripped off; when drive 113 is in operation while controller 621 is in a "sleep-mode"; when the encoder (not shown) of drive 113 is defective; when there is a defect at the coupler 140, i.e., when transmission of moment between drive 113 and lead-screw 112 is defective; or when the coupling between the encoder (not shown) and the motor of drive 113 is slipping or is lost.

Whether the rate at which rotation-indicating-signal is sent to controller 621 deviates from a predetermined threshold, may be determined, for example, by controller 621 of drive 113 or by any other suitable processing and/or controlling unit operatively associated with drive 113 and sensor 620.

It is to be understood that device 100 may include or may be operatively associated with alternative or additional sensors and/or mechanisms that are adapted to provide a controller such as, e.g. controller 621 with an input indicating the operational status of components that are included in device 100 and/or that are operatively associated with device 100. For example, instead of the magnet 141, an optical vane or a reflector may be used and instead of sensor 620, an optical sensor may be used. Likewise, a rotating metal protrusion and an inductive sensor may also be used instead of magnet 141 and sensor 620.

Figure 7A:
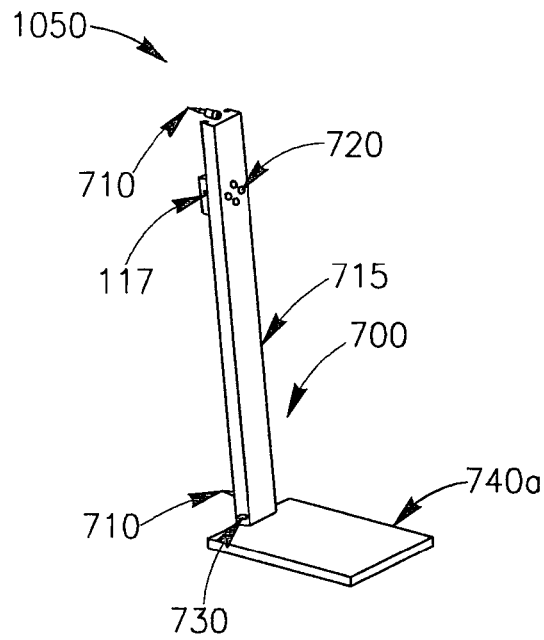
FIG. 7a is an isometric view of a rod-less cylinder lifting system that includes the device and a holder mechanism mechanically coupled thereto, according to an embodiment of the invention.
Figure 7B:
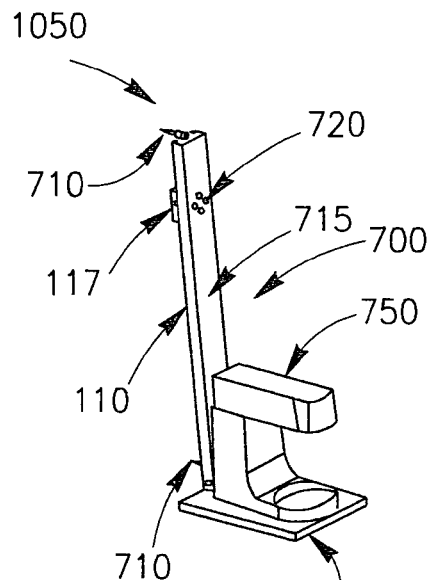
Figure 7C:
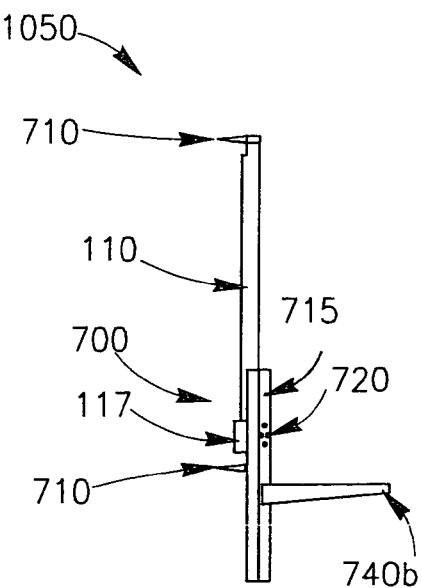
FIG. 7c is a schematic side view of a rod-less cylinder lifting system, according to an alternative embodiment of the invention.

Reference is now made to FIGS. 7a, 7b and 7c. According to some embodiments of the invention, a holder mechanism 700 is mechanically coupled to device 100 thereby forming a rod-less cylinder lifting system, hereinafter referred to as "system", 1050. Holder mechanism 700 may be made of a formwork 715 and may include an item support such as, e.g., item support 740a shown in FIG. 7a or item support 740b shown in FIG. 7b. It is to be understood that for exemplary purposes only, the item support is hereinafter referred to as support 740a.

According to some embodiments of the invention, item support 740a is mechanically coupled to formwork 715 and is adapted to provide a support for various items such as, e.g., item 750.

Figure 8:
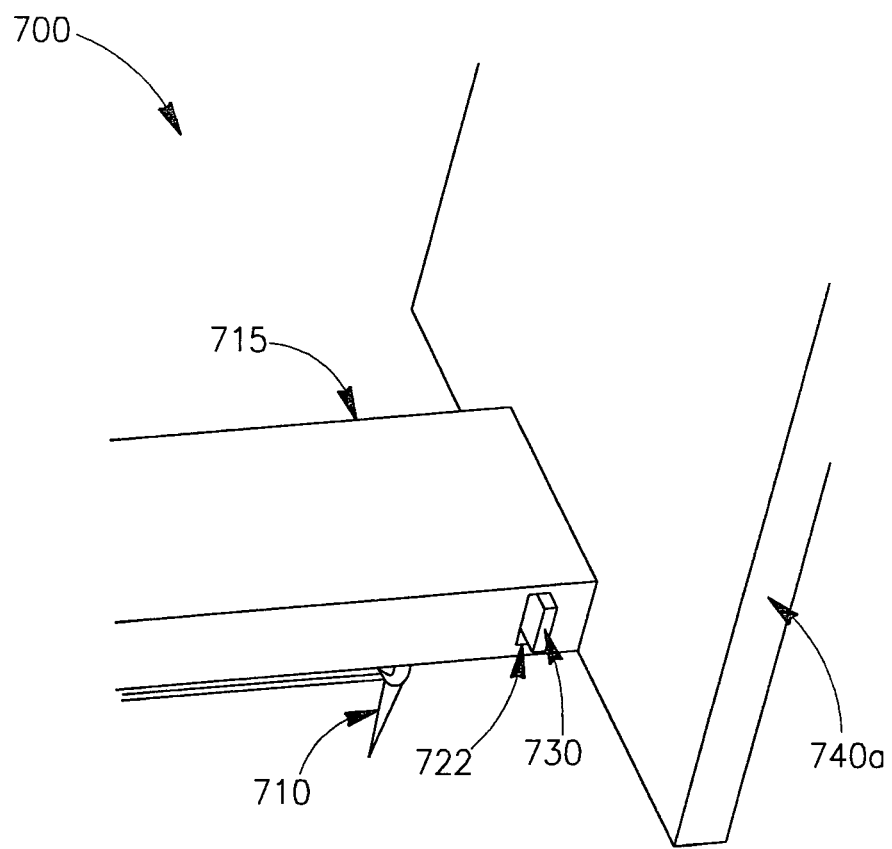
FIG. 8 is a detailed isometric view of a coupling mechanism adapted to couple the item support to a formwork of the holder mechanism, according to an embodiment of the invention.

Turning now to FIG. 8, item support 740a may be mechanically coupled to formwork 715 as outlined hereinafter. In an embodiment of the invention, the bottom of formwork 715 has two slits 722, which are located substantially opposite to each other and which may have a substantially rectangular shape. A rod 730 is inserted into slits 722, whereby item support 740a is mechanically coupled to said rod 730 via, e.g., suitable fasteners 741, which may include, for example, bolts, screws, spacers, nails and the like. Accordingly, item support 740a is mechanically coupled to formwork 715. Rod 730 is made of a suitably strong material, such as, for example, a metallic material.

Figure 9:
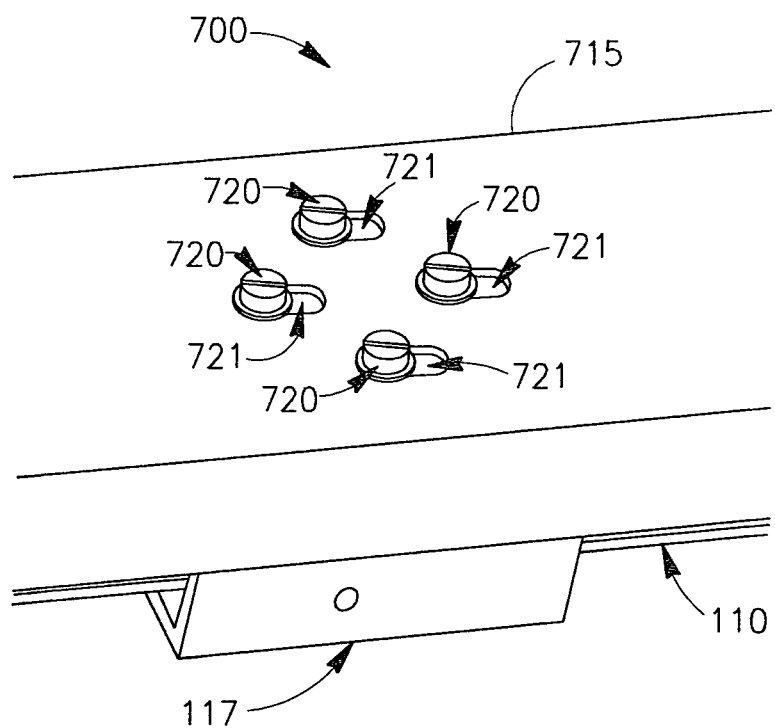
FIG. 9 a detailed isometric view of a coupling mechanism adapted to couple the holder mechanism to the rod-less cylinder device, according an embodiment of the invention.
Figure 10:
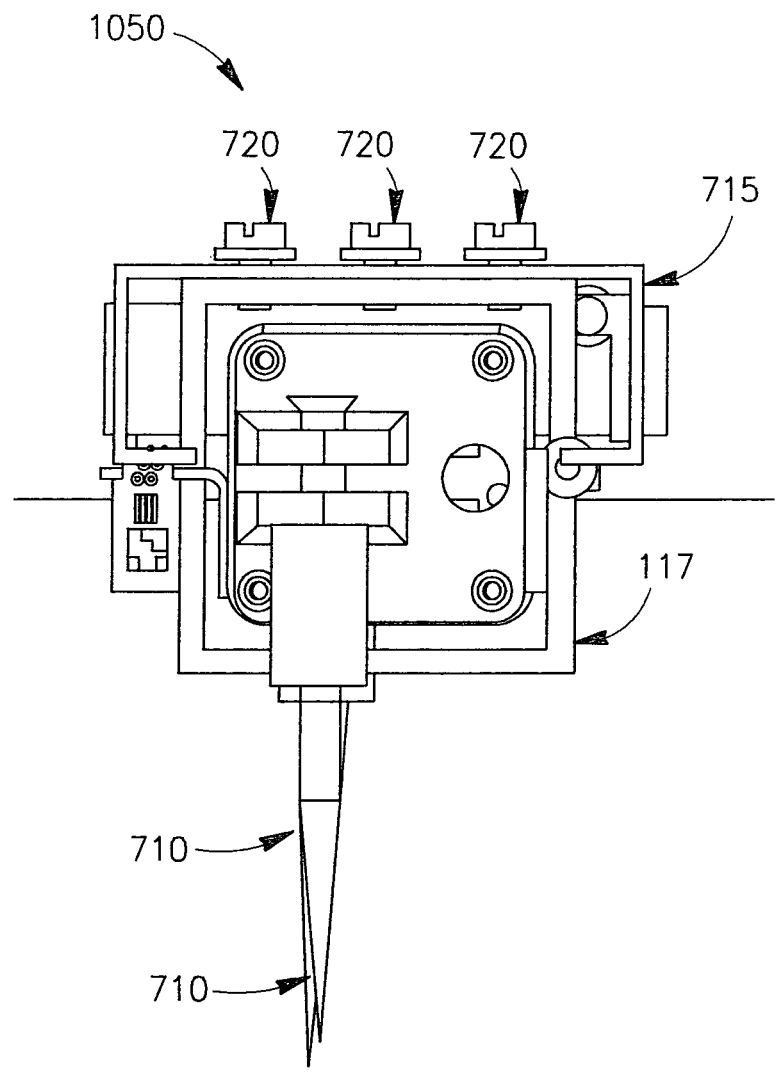
FIG. 10 is a sectional front view of the rod-less cylinder lifting system according an embodiment of the invention.

Reference is now made to FIGS. 9 and 10. According to some embodiments of the invention, holder mechanism 700 is mechanically coupled to device 100 via holes 721 by suitable fasteners 720. Accordingly, when operating drive 113, holder mechanism 700 may move relative to slider 117.

According to some embodiments of the invention, formwork 715 has the function of concealing device 100 as well as protecting device 100 from dirt, dust, damages and the like. Furthermore, in some embodiments of the invention, formwork 715 has the function of a protective cover that prevents clamping of items and body parts, such as fingers, into device 100.

Figure 11:
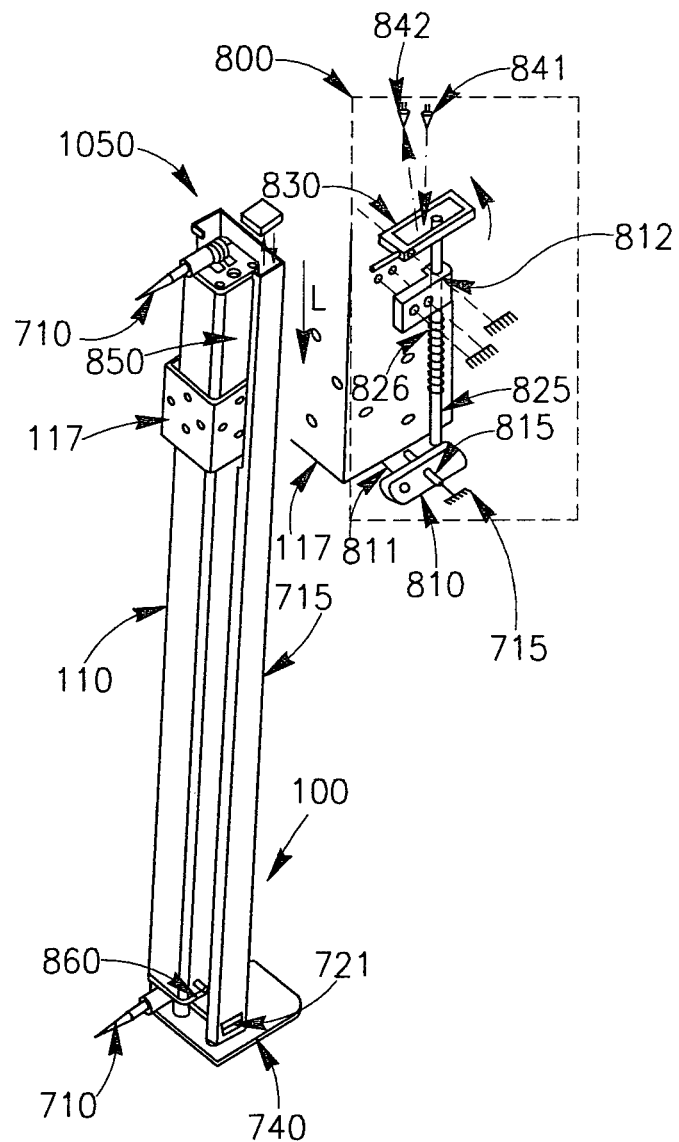
FIG. 11 is an isometric view of the rod-less cylinder lifting system, wherein the system is equipped with a safety mechanism, according to an embodiment of the invention.

Further reference is now made to FIG. 11. In some embodiments of the invention, system 1050 is equipped with a system safety mechanism 800, which is operatively associated with drive 113. System safety mechanism 800 is adapted to stop operation of drive 113 in case downward movement of item support 740 is obstructed.

In an embodiment of the invention, system safety mechanism 800 includes a toggle element 810, which is rotatably coupled by, e.g., pin 815, to the inside of formwork 715 below slider 117. Toggle element 810 includes a protrusion 811 positioned below slider 117. A motion transfer element 825 is mechanically associated with the toggle element 810 and fixedly attached with a guide 812 to the inner side of formwork 715. System safety mechanism 800 further includes a rotatable reflector element 830 adapted to provide drive 113 with an input representing information whether downward movement of item support 740 is obstructed or not as outlined hereinafter. Reflector element 830 may be implemented by a mirror, a filter or by any other suitable reflector element.

When downward movement of item support 740 is unobstructed, reflector element 830 is positioned such that light emitted from a light source 841 is substantially reflected towards light detector 842, which in turn provides the controller of drive 113 with a corresponding input. It is to be understood that light source 841 as well as light detector 842 may be adapted or be replaced by sources and detectors that are able to emit and detect electromagnetic waves, respectively, which are not in the visible spectrum.

In the event that downward movement of item support 740 is obstructed, downward movement of formwork 715 is obstructed as well. Therefore, slider 117 moves downward relative to formwork 715, as schematically indicated with arrow L causing slider 117 to push down protrusion 811. In turn, toggle element 810 pushes motion transfer element 825 upwards against the force applied by spring 826 such that reflector element 830 rotates. In consequence, a light emitted from light source 841 is deflected from detector 842, thus providing the controller of drive 113 with an indication that downward movement of item support 740 is obstructed or that slider 117 has reached the lower edge of shaft 110. In both cases, the controller stops the operation of drive 113.

According to some embodiments of the invention, system safety mechanism 800 is adapted to provide the controller of drive 113 with an input that item support 740 reached his most elevated position. In the event that item support 740 reaches the most elevated position, an upper pin 850, which is fixedly connected to shaft 110, hits a flexible protrusion of reflector element 830, thereby causing reflector element 830 to tilt. As a result, light emitted from light source 841 is deflected from detector 842, thus indicating the controller of drive 113 that item support 740 has reached the most elevated position.

Similarly, according to some embodiments of the invention, system safety mechanism 800 is adapted to provide the controller of drive 113 with an input that item support 740 reached the lowest position. When item support 740 reaches the lowest position, a lower pin 860, which is fixedly connected to shaft 110, hits the right hand side of toggle element 810, thereby causing reflector element 830 to tilt. As a result, light emitted from light source 841 is deflected from detector 842, thus indicating the controller of drive 113 that item support 740 has reached the lowest position;

Reference is now made to FIG. 12a. Additionally or alternatively, system 1050 is equipped with an alternative system safety mechanism 1100 whose elements are schematically encircled by dashed boxes. According to an embodiment of the invention, system safety mechanism 1100 includes light source 841 and light detector 842. System safety mechanism 1100 further includes a lever 1150 which has a reflecting surface and which is rotatably coupled formwork 715. System safety mechanism 1100 further includes a lower stopper 1120 that is fixedly connected to shaft 110 at a position that corresponds to the lowest position of sleeve 117, and an upper stopper 1130 that is fixedly connected to shaft 110 at a position that corresponds to the highest position of sleeve 117. When sleeve 117 is located between its highest and lowest positions, lever 1150 is positioned such that light emitted from light source 841 is substantially reflected by lever 1150 towards light detector 842, thereby providing the controller with information to continue the operation of drive 113.

Turning now to FIG. 12b, at the lowest position of sleeve 117, a stopper 1125 that is fixedly attached to formwork 715 collides with stopper 1120. In turn, formwork 715 is pushed up relative to slider 117, thereby causing slider 117 to be lower in relation to formwork 715. As a result, reflector 1150 drops by gravity, thereby causing lever 1150 to rotate as schematically indicated with arrow M1. Hence, light emitted by light source 841 is deflected away from light detector 842, thereby providing the controller with information to stop the operation of drive 113.

Similarly, as schematically illustrated in FIG. 12c, in the event that sleeve 117 reaches its highest position, lever 1150 hits an upper stopper 1130 such that stopper 1130 applies another moment on lever 1150 causing lever 1150 to rotate, as schematically indicated with arrow M2. As a result, light emitted by light source 841 is deflected away from light detector 842, thereby providing the controller with information to stop the operation of drive 113.

Reference is now made to FIG. 12d. In the event that formwork 715 hits an obstacle (not shown) while moving downward, sleeve 117 may be lower than formwork 715 such that gravitational force causes lever 1150 to tilt. In turn, lever 1150 rotates as schematically indicated with arrow M1. As a result, light is deflected away from light detector 842. Therefore, an indication is provided to a controller such as, e.g., controller 621, to stop the operation of drive 113.

Figure 17:
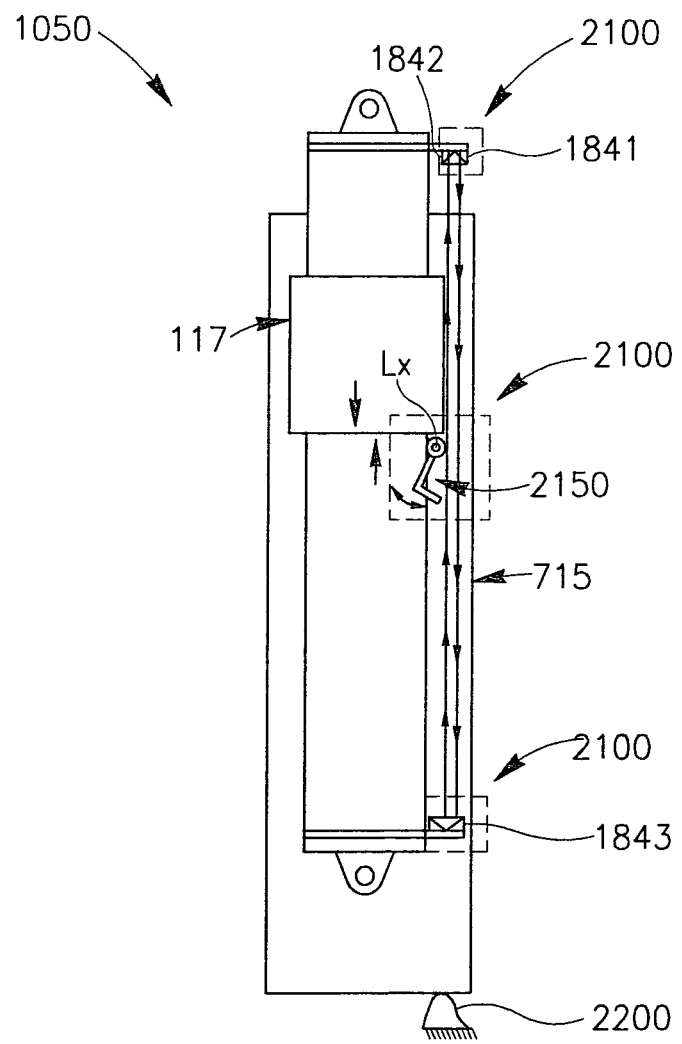
FIG. 17 is a schematic side view of the rod-less cylinder lifting system, wherein the system is equipped with an alternative system safety mechanism, according to an embodiment of the invention.

Reference is now made to FIG. 17. Additionally or alternatively, system 1050 is equipped with an alternative system safety mechanism 2100 whose elements are schematically encircled by dashed boxes. According to an embodiment of the invention, system safety mechanism 2100 includes light source 1841, a light detector 1842 and a retro reflector 1843. When downward movement of formwork 715 is unobstructed, light emitted from a light source 1841 is substantially reflected by retro reflector 1843 towards light detector 1842, which in turn provides the controller of drive 113 with a corresponding input. It is to be understood that light source 1841 as well as light detector 1842 may be adapted or be replaced by sources and detectors that are able to emit and detect electromagnetic waves, respectively, which are not in the visible spectrum.

System safety mechanism 2100 further includes a lever 2150, which is rotatably coupled formwork 715 about a lever axis Lx. In the event that downward movement of formwork 715 is obstructed by an object 2200, slider 117 moves downward relative to formwork 715 causing lever 2150 to rotate about lever axis Lx and intercept the light being emitted by light source 1841 towards retro reflector 1843 and/or the light being reflected back from reflector 1843 to detector 1842, thus providing the controller of drive 113 with an indication that downward movement of formwork 715 is obstructed.

According to some embodiments of the invention, system safety mechanism 2100 is adapted to provide the controller of drive 113 with an input that formwork 715 reached his most elevated position or lowest position.

Figure 19:
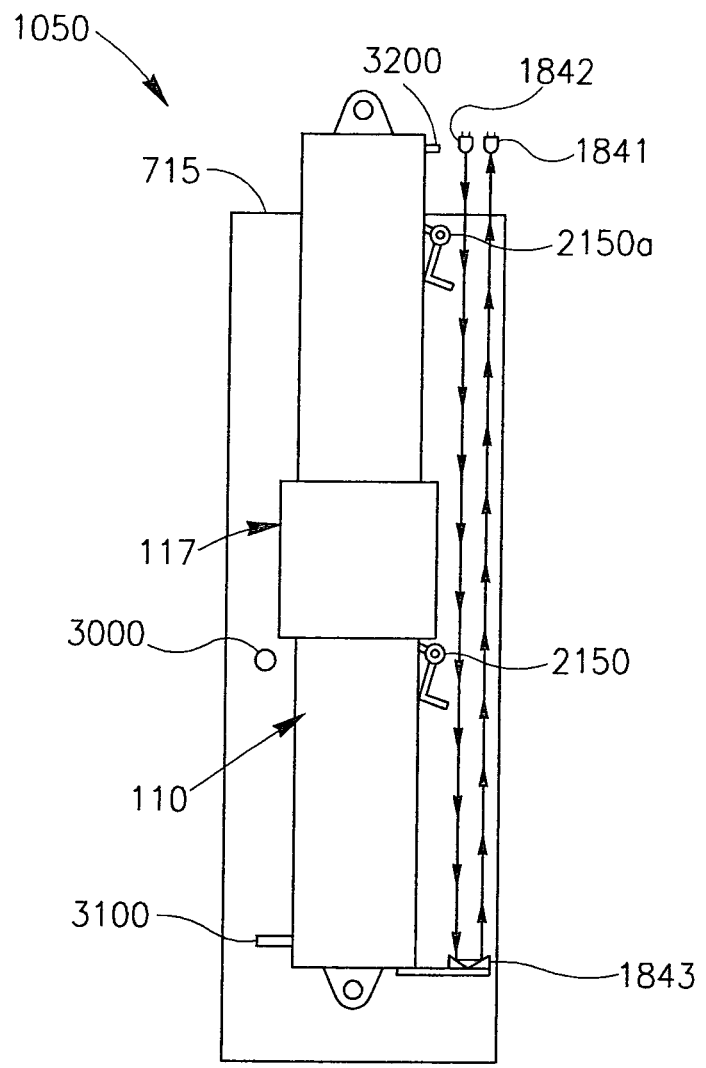
FIG. 19 is a schematic side view of the rod-less cylinder lifting system, wherein the system is equipped with another alternative system safety mechanism, according to another embodiment of the invention The drawings taken with description make apparent to those skilled in the art how the invention may be embodied in practice.

Reference is now made to FIG. 19. Additionally or alternatively, system safety mechanism 2100 may include an additional lever 2150a at an upper portion of formwork 715, formwork 715 may include a stop 3000 and shaft 110 may include upper and lower stops 3200, 3100 at upper and lower portions thereof. As described with regards to the embodiment shown in FIG. 17, when downward movement of formwork 715 is obstructed by an object 2200, slider 117 moves downward relative to formwork 715 causing lever 2150 to rotate and intercept the light being emitted by light source 1841 towards retro reflector 1843 and/or the light being reflected back from reflector 1843 to detector 1842, thus providing the controller of drive 113 with an indication that downward movement of formwork 715 is obstructed.

In the embodiment of FIG. 19, when formwork 715 reaches an elevated position, lever 2150a abuts stop 3200 and thereby rotates and intercepts the light being emitted by light source 1841 towards retro reflector 1843 and/or the light being reflected back from reflector 1843 to detector 1842, thus providing the controller of drive 113 with an indication that formwork 715 reached its elevated position.

In addition in this embodiment, when formwork 715 is in its lowest position in which stop 3000 abuts stop 3100, slider 117 moves downward relative to formwork 715 causing lever 2150 to rotate and intercept the light being emitted by light source 1841 towards retro reflector 1843 and/or the light being reflected back from reflector 1843 to detector 1842, thus providing the controller of drive 113 with an indication that downward movement of formwork 715 is obstructed.

It should be understood that device 100 may include all of the aforementioned safety mechanisms as well as only some of the aforementioned safety mechanisms.

Figure 13A:
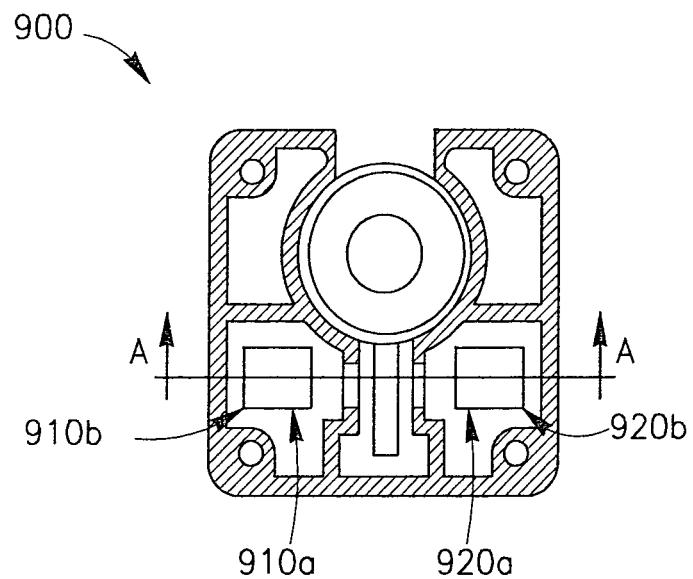
FIG. 13a is a schematic illustration of a cross-sectional view of the rod-less cylinder device equipped with an optical setup for upper and lower travel limit detection in the device, according to an embodiment of the invention.
Figure 13B:
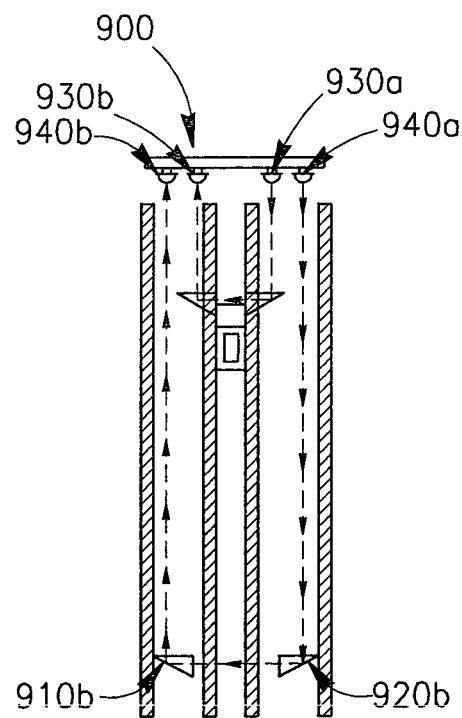

Additional reference is made to FIG. 13a, which schematically illustrates a cross-sectional view of device 100, which may include an optical setup for data transmission, according to an embodiment of the invention; and to FIG. 13b, which schematically illustrates a length-sectional view of device 100 showing the optical setup, according to an embodiment of the invention.

As already indicated with reference to FIG. 1, device 100 is equipped in some embodiments with a sensor 131 to indicate drive 113 when nut 114 reaches one of the edges of shaft 110. In order to transmit the information from sensor 131 to drive 113, device 100 includes an optical setup 900, which includes reflector elements 3a and 6a, as well as reflector elements 910a, 910b, 920a and 920b. optical setup 900 also includes a first light source 930a and a first detector 930b and second light source and detector 940a and 940b, respectively.

In an embodiment of the invention, when nut 114 is located between the two outer edges of shaft 110, light emitted by light source 930a is reflected to detector 930b by reflector 920a and 910a. Furthermore, light emitted by light source 940a is reflected to detector 940b by detector 920b and 910b. In the event that plate 5 of nut 114 is located between reflectors 910a and 920a, light emitted from source 930a will not be detected by detector 930b, thereby providing drive 113 with an indication that nut 114 has reached one edge of shaft 110. In response, the control board stops operation of drive 113. Similarly, in the event that plate 5 of nut 114 is located between reflectors 910b and 920b, light emitted from source 940a will not be detected by detector 940b, thereby providing drive 113 with an indication that nut 114 has reached the other edge of shaft 110. In response, the control board stops operation of drive 113.

Figure 14:
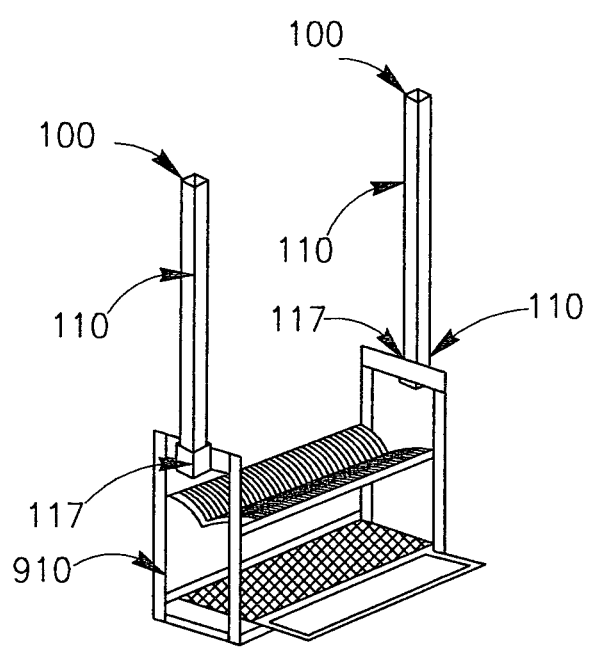
FIG. 14 is a schematic illustration of a plurality of rod-less cylinder devices that are adapted to lift an item, according to an embodiment of the invention.

Reference is now made to FIG. 14.

According to some embodiments of the invention, respective controllers enable synchronization between a first and a second drive 113 of two or more respective devices 100 according to the load carried by each device 100. If for example, the load carried by a first device 100 is higher than the load carried by a second device 100, the controller provides the drive 113 of the first device with an input to generate a moment that is correspondingly larger or lower than the moment generated by the second drive 113, thereby preventing crashing of, e.g., an item 910, due to uneven distribution of the load on the two devices 100.

Figure 15:
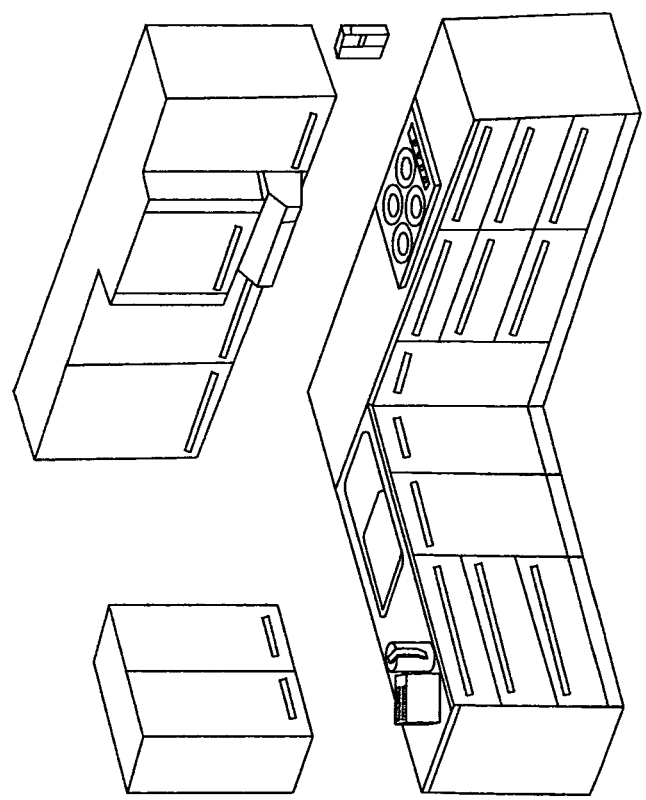
FIG. 15 is a schematic illustration of an overhead kitchen concept by utilizing rod-less cylinder devices, wherein kitchen appliances are concealed in over head kitchen cabinets.

Reference is additionally made to FIG. 15 which is a schematic illustration of an overhead kitchen concept by utilizing rod-less cylinder devices, wherein kitchen appliances are concealed in overhead kitchen cabinets. It is noted that kitchen appliances may be compactly concealed in kitchen cabinets by use of the rod-less cylinder device in accordance with the present invention. For example, a given kitchen appliance may be located adjacent to the sleeve 117 and thereby may be stored adjacent to an upper portion of shaft 110 within a cabinet.

Figure 16:
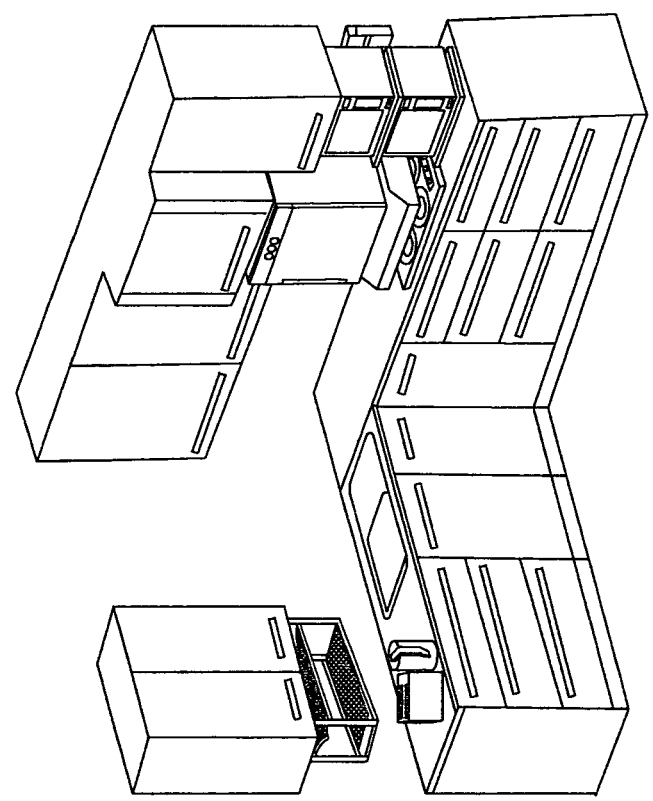
FIG. 16 is a schematic illustration of the implementation of an overhead kitchen concept by utilizing rod-less cylinder devices, wherein some of the kitchen appliances are unconcealed, according to an embodiment of the invention.

FIG. 16 is a schematic illustration of the implementation of an overhead kitchen concept by utilizing rod-less cylinder devices, wherein some of the kitchen appliances are unconcealed, according to an embodiment of the invention.

According to some embodiments of the invention, sensors (e.g. sensor 131), drive 113 and all other components of device 100 are operatively associated with each other via wireless communication links such as, e.g., optical links, radio frequency links, and the like. Thusly configured, electrical wiring between the components in device 100 can be eliminated. In consequence, device 100 can be manufactured by a fully automatic assembly system, can be easily installed for use, has low manufacturing costs and improved reliability.

According to some embodiments of the invention, a plurality of devices 100 are operatively associated via wireless communication links to a control board (not shown), which is adapted to control the operation of said plurality of devices 100.

According to some embodiments of the invention, the present invention provides a method for operating one or more devices 100 and/or systems 1100.

The method may include, for example, the step of actuating drive 113.

The method may include, for example, the step of providing drive 113 with an input indicating that sleeve 117 has reached its lowest position on shaft 110.

The method may include, for example, the step of providing drive 113 with an input indicating that sleeve 117 has reached its highest position on shaft 110.

The method may include, for example, the step of providing drive 113 with an input indicating uncontrolled movement of the sleeve 117 along shaft 110.

The method may include, for example, the step of controlling a plurality of drives 113 according to the load carried by respective sleeves 117.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A rod-less cylinder device adapted to longitudinally displace loads, said device comprising:
 a shaft;
 a nut confined to move longitudinally within the shaft;
 a slider circumscribing said shaft and coupled to said nut;
 a drive adapted to displace said nut within said shaft, and
 a sensing means, wherein
said sensing means is adapted to affect a signal sent via wireless means towards said drive.

2. The rod-less cylinder device of claim 1, wherein said device is adapted to selectably lower from and lift appliances into storage compartments thereby enabling to implement an overhead kitchen system.

3. The rod-less cylinder device of claim 1, wherein said wireless means is optic means.

4. The rod-less cylinder device of claim 3, wherein said optic means comprises a light source and a light detector, and wherein said sensing means determines whether light emitted by said source is detected by said detector.

5. The rod-less cylinder device of claim 4, wherein said optic means comprises a reflector adapted to reflect light received from said source along a path towards said detector, and wherein said sensing means is adapted to bias said reflector and thereby deflect the light away from said detector.

6. The rod-less cylinder device of claim 5, wherein said sensing means is associated with an object being biased by said nut, said object being adapted to slightly move in relation to said nut when abutting an obstacle, wherein said slight movement urges said sensing means to bias the reflector.

7. The rod-less cylinder device of claim 4, wherein said optic means comprises a reflector mounted to said sensing means, and wherein at least at one position of said sensing means said light from said source is reflected along a path towards said detector.

8. The rod-less cylinder device of claim 4, wherein said optic means comprises a reflector adapted to reflect light received from said source along a path towards said detector, and wherein at least at one position of said device said sensing means blocks light being emitted from said source or being reflected towards said detector.

9. The rod-less cylinder device of claim 8, wherein said sensing means is associated with an object being biased by said nut, said object being adapted to slightly move in relation to said nut when abutting an obstacle, wherein said slight movement urges the sensing means to block said light being emitted from said source or being reflected towards said detector.

10. The rod-less cylinder device of claim 8, wherein said sensing means is a plate.

11. The rod-less cylinder device of claim 10, wherein said plate is coupled to said nut.

12. The rod-less cylinder device of claim 5, wherein said reflector is a retro reflector.

13. The rod-less cylinder device of claim 1, wherein said device comprises a lead screw adapted to move said nut along said shaft.

14. The rod-less cylinder device of claim 13, wherein said sensing means is adapted to sense the movement of said nut according to the rate of rotation of said lead screw.

15. The rod-less cylinder device of claim 14, wherein said sensing means comprises a magnet.

16. The rod-less cylinder device of claim 15, wherein each time said magnet rotates a predefined angle a signal is sent to said sensing means.

17. The rod-less cylinder device of claim 16, wherein at given time intervals said sensing means determines movement rate of said nut according to the rate of signals received.

18. The rod-less cylinder device of claim 17, wherein a deviation in movement rate between subsequent time intervals being above a predetermined threshold stops said drive.

19. The rod-less cylinder device of claim 1, wherein said sensing means stops the movement of said nut.

20. The rod-less cylinder device of claim 17, wherein the movement is stopped if an object being biased by said nut reaches an end of the shaft or abuts an obstacle.

21. The rod-less cylinder device of claim 1, wherein said cylinder is configured to displace a same load, wherein said device controls the movement provided by each cylinder to be similar.

22. A rod-less cylinder device adapted to longitudinally displace loads, said device comprising:
 a shaft;
 a lead screw adjusted along the longitudinal axis of said shaft, said lead screw being adapted to receive a nut, wherein said nut is confined to move longitudinally within the shaft;
 a bearing cage adapted to accommodate bearing elements, wherein said bearing cage circumscribes said shaft and wherein said bearing cage is mechanically coupled to said nut;
 a slider circumscribing said bearing cage, wherein said slider is mechanically coupled to said nut;
 a drive adapted to selectably rotate said screw, wherein the direction of longitudinal displacement of said nut within said shaft depends on the direction of rotational movement of said drive.

23. The rod-less cylinder device of claim 22, wherein said device is adapted to selectably lower from and lift appliances into storage compartments thereby enabling to implement an overhead kitchen system.

24. The rod-less cylinder according to claim 22, comprising a formwork coupled to said slider and being adapted to slightly move in relation to said slider when abutting an obstacle.

25. The rod-less cylinder according to claim 24, wherein said slight movement of said formwork affects a safety mechanism that stops the drive.

\* \* \* \* \*